United States Patent [19]

Gold et al.

[11] Patent Number: 5,142,769
[45] Date of Patent: Sep. 1, 1992

[54] MONITOR AND CONTROL ASSEMBLY FOR USE WITH A CAN END PRESS

[75] Inventors: Phillip W. Gold, Lakewood; Bruce A. Moen, Golden, both of Colo.

[73] Assignee: Coors Brewing Company, Golden, Colo.

[21] Appl. No.: 481,910

[22] Filed: Feb. 14, 1990

Related U.S. Application Data

[63] Continuation-in-part of Ser. No. 219,203, Jul. 14, 1988, Pat. No. 4,939,665.

[51] Int. Cl.$^5$ .............................................. B21D 17/00
[52] U.S. Cl. .................................. 29/621.1; 413/56; 72/19; 72/20
[58] Field of Search ................. 29/621.1, 401.1; 72/19, 72/20; 413/56

[56] References Cited

U.S. PATENT DOCUMENTS

| | | | |
|---|---|---|---|
| 3,246,385 | 4/1966 | King | 29/621.1 |
| 3,257,652 | 6/1966 | Foster . | |
| 3,444,390 | 1/1968 | Breidenbach et al. . | |
| 3,612,966 | 10/1971 | Dybel . | |
| 3,680,365 | 8/1972 | Summers . | |
| 3,884,068 | 5/1975 | Dybel . | |
| 3,930,248 | 12/1975 | Keller . | |
| 3,965,744 | 6/1976 | Gutjahr . | |
| 4,010,679 | 3/1977 | Dybel . | |
| 4,016,744 | 4/1977 | Williams et al. . | |
| 4,023,044 | 5/1977 | Miller et al. . | |
| 4,033,252 | 7/1977 | Baker . | |
| 4,048,848 | 9/1977 | Dybel . | |
| 4,057,713 | 11/1977 | Mette et al. . | |
| 4,059,991 | 11/1977 | Dybel et al. . | |
| 4,062,055 | 12/1977 | Dybel et al. . | |
| 4,088,899 | 5/1978 | Miller et al. . | |
| 4,098,105 | 7/1978 | Fullers et al. . | |

(List continued on next page.)

FOREIGN PATENT DOCUMENTS 2743599 4/1978 Fed. Rep. of Germany .

OTHER PUBLICATIONS

Toledo Transducers, Inc., "Load Meter Model No. N312L" dated Aug. 7, 1979 (17 pages).
Toledo Transducers, Inc., "Load Meter Model No. N402" dated Apr. 24, 1981 (25 pages).
Blumel, Klaus W. et al., "Variations of the Stamping Process," from the 15th Biennial Congress International Deep Drawing Research Group, May 16–18, 1988, Dearborn, Mich., pp. 9–16.

*Primary Examiner*—Bruce M. Kisliuk
*Assistant Examiner*—Jack Lavinder
*Attorney, Agent, or Firm*—Klaas, Law, O'Meara & Malkin

[57] ABSTRACT

A control assembly for use in controlling the operation of a can end press of the type having a plurality of operating stations for performing different work operations on a can end passing through the press, each operating station including a fixed station portion and a reciprocally movable station portion which engages a can end mounted on the fixed station portion, comprising: strain gauge operatively associated with at least one of the operating stations for detecting the strain experienced in a portion of the station during press operation and for providing a strain gauge signal indicative thereof; data processing assembly for receiving and processing the signal of the strain gauge for detecting a signal condition conforming to predetermined criteria associated with an abnormal operating state of the press and for providing a control signal responsive to the detected abnormal operating state.

10 Claims, 9 Drawing Sheets

U.S. PATENT DOCUMENTS

| | | |
|---|---|---|
| 4,116,050 | 9/1978 | Tanahashi et al. . |
| 4,121,449 | 10/1978 | Celi . |
| 4,125,009 | 11/1978 | Byrd et al. . |
| 4,171,646 | 10/1979 | Dybel et al. . |
| 4,177,517 | 12/1979 | Mette et al. . |
| 4,195,563 | 4/1980 | Budraitis et al. . |
| 4,274,282 | 6/1981 | Budraitis et al. . |
| 4,289,022 | 9/1981 | Dybel et al. . |
| 4,320,463 | 3/1982 | Himmelstein . |
| 4,408,471 | 10/1983 | Gossard et al. . |
| 4,419,900 | 12/1983 | Scott et al. . |
| 4,429,627 | 2/1984 | Edso . |
| 4,446,787 | 5/1984 | Nishikawa et al. . |
| 4,453,421 | 6/1984 | Umano . |
| 4,466,318 | 8/1984 | Schoch . |
| 4,470,287 | 9/1984 | Antonov et al. . |
| 4,481,589 | 11/1984 | McGowan et al. . |
| 4,504,920 | 3/1985 | Mickowski . |
| 4,532,793 | 8/1985 | Besold . |
| 4,536,849 | 8/1985 | Borisch et al. . |
| 4,548,066 | 10/1985 | Martinez et al. . |
| 4,570,229 | 2/1986 | Breen et al. . |
| 4,592,220 | 6/1986 | Martinez et al. . |
| 4,593,547 | 6/1986 | Heiberger . |
| 4,608,843 | 9/1986 | Grims . |
| 4,633,720 | 1/1987 | Dybel et al. . |
| 4,671,124 | 6/1987 | Seliga . |
| 4,692,857 | 9/1987 | Chi . |
| 4,695,414 | 9/1987 | Forslund et al. . |
| 4,723,429 | 2/1988 | Weber et al. . |
| 4,750,131 | 6/1988 | Martinez . |
| 4,812,984 | 3/1989 | Yerly et al. . |
| 4,813,320 | 3/1989 | Malloy et al. . |
| 4,817,006 | 3/1989 | Lewis . |
| 4,855,606 | 8/1989 | Walters . |
| 4,855,923 | 8/1989 | Fullmer . |
| 4,866,429 | 9/1989 | Granere . |
| 4,987,528 | 1/1991 | O'Brien ................................ 364/184 |

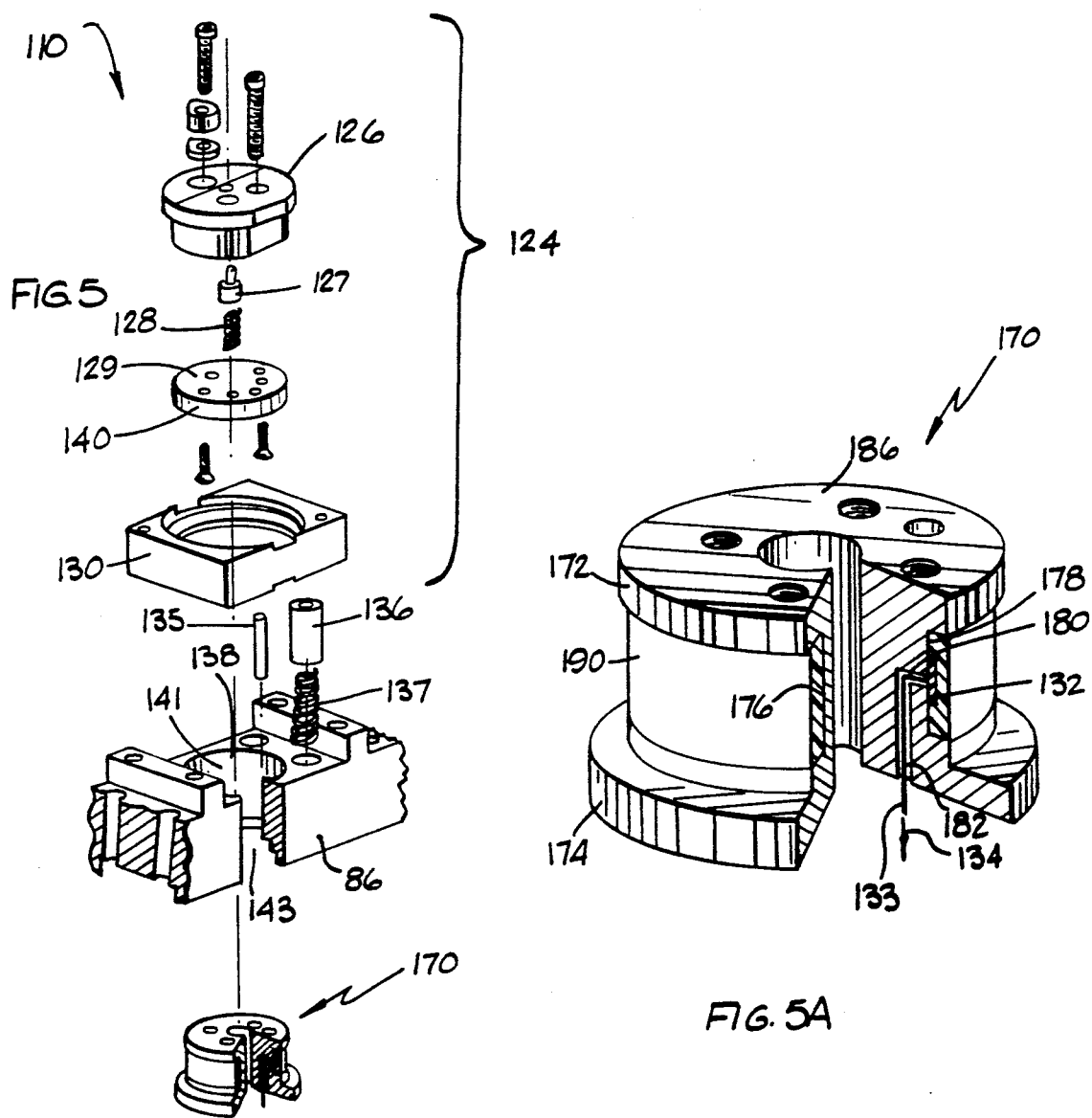

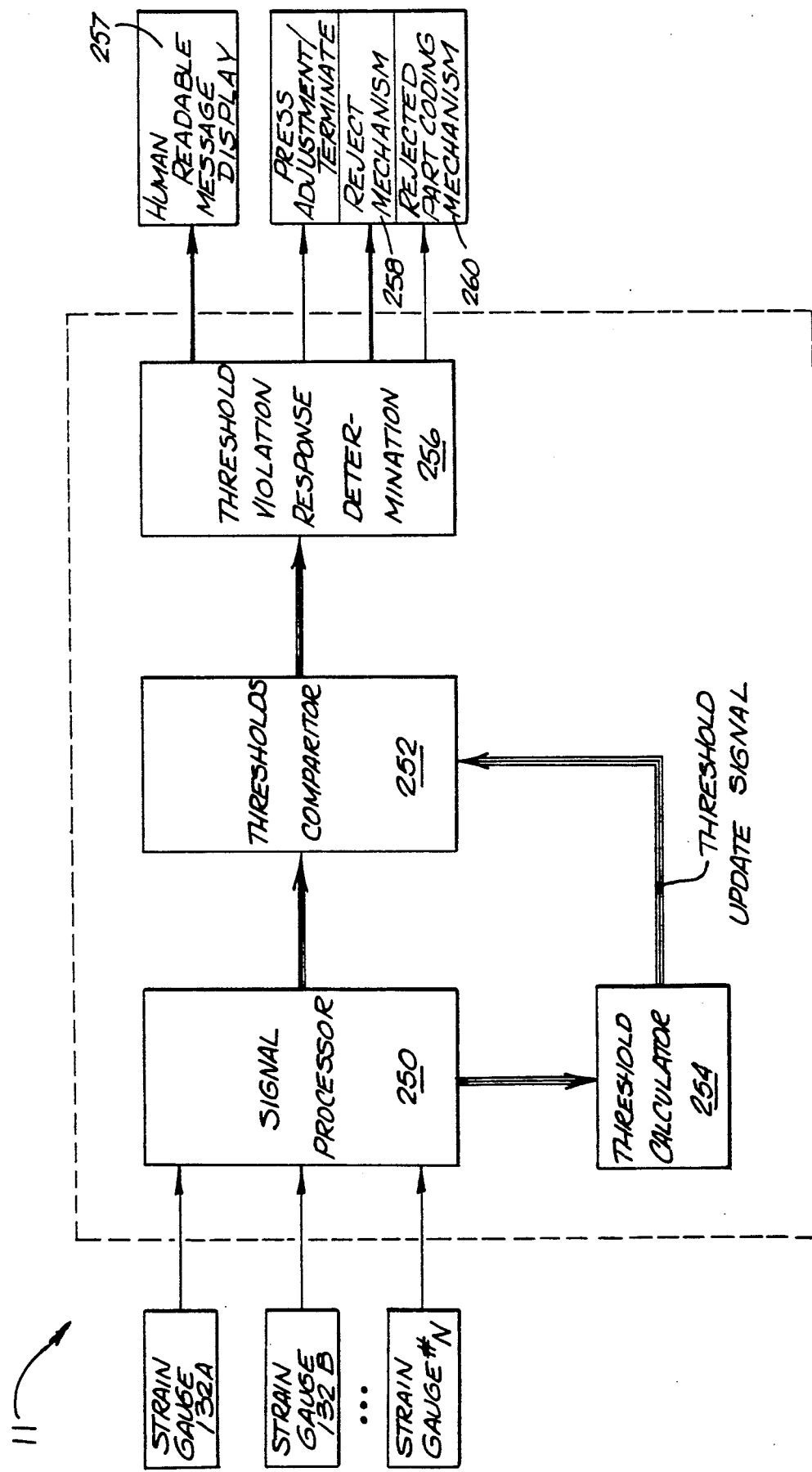

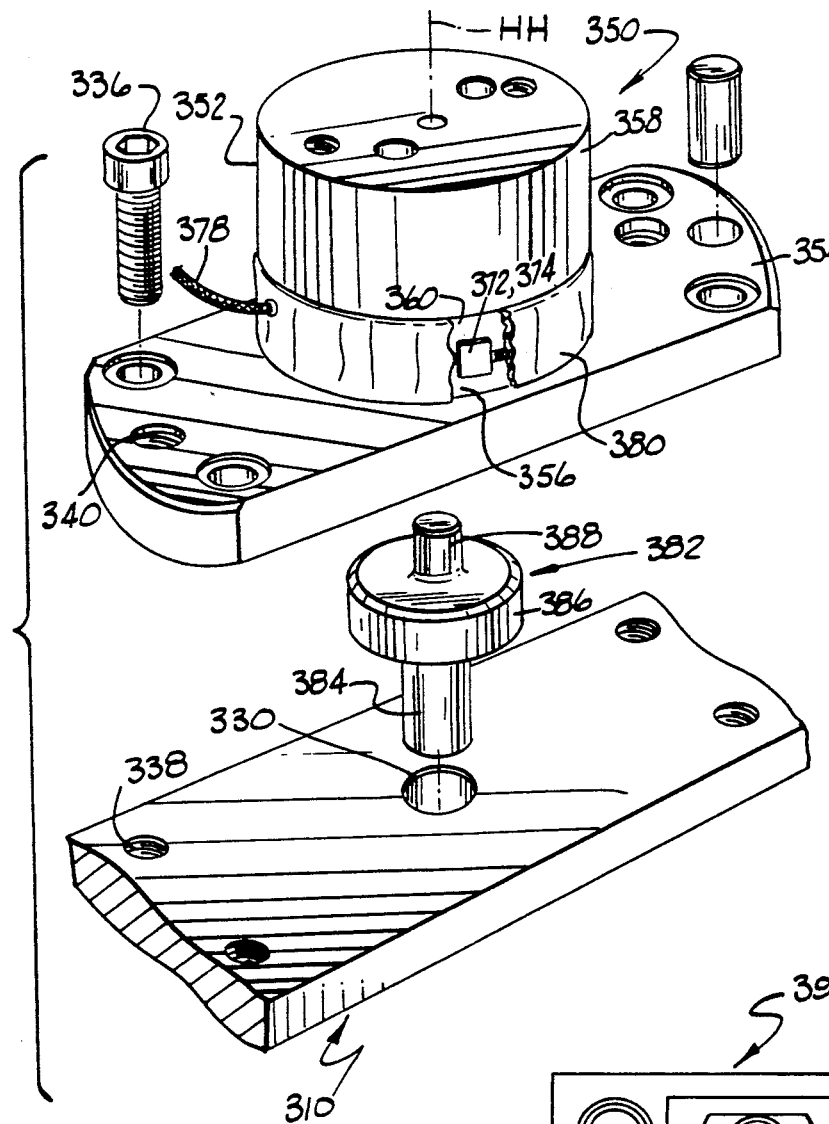
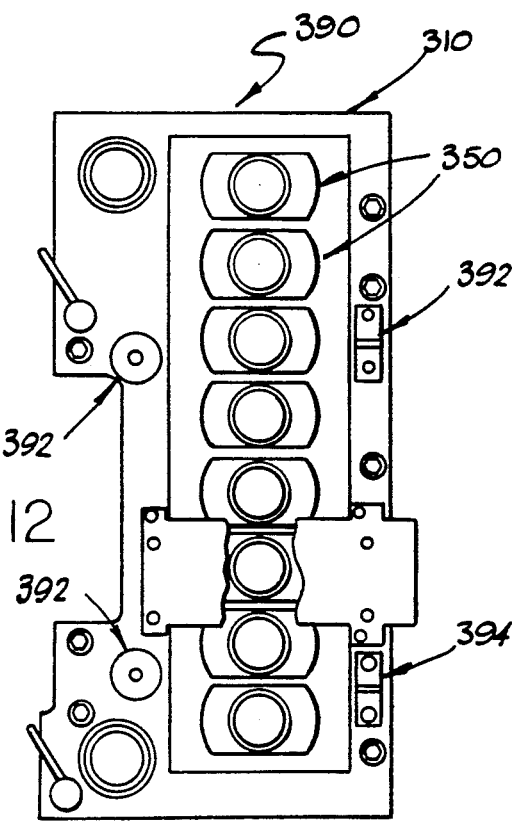

MONITOR AND CONTROL ASSEMBLY FOR USE WITH A CAN END PRESS

The present application is a continuation-in-part of U.S. Pat. application Ser. No. 219,203 filed July 14, 1988, now U.S. Pat. No. 4,939,665 which is hereby specifically incorporated by reference for all that is discloses.

BACKGROUND OF THE INVENTION

The present invention relates generally to the production of can ends and, more particularly, to a control assembly for detecting abnormal can end press operating conditions associated with the production of defective can ends and for providing an appropriate system response to the abnormal operating condition.

The production of modern beverage cans includes the production of can bodies, the production of separate can ends, and the subsequent attachment of can ends to the can bodies after the can bodies have been filled with beverage. The production of can ends generally includes the separate production operations of can end blank formation and can end conversion. During can end blank formation, sheet metal is cut and formed into generally circular-shaped can end blanks. Each blank includes a generally flat central region and a curved, upwardly extending, peripheral flange region. During the subsequent operation of can end conversion, the can end blanks pass through a can end press having a plurality of conversion die stations at which different work operations are performed on the can end blank. Typical operations performed on a can end during movement thereof through a can end press include the scoring of the flat region of the can end to provide a weakened region which will subsequently form an opening in the can end after rupture thereof by a consumer; the formation of a rivet adjacent to the scored region; attachment of a tab to the rivet to facilitate the rupturing of the scored region; the embossing of the flat region of the can end to provide predetermined alphanumeric characters on the surface of the can end; and the debossing of a predetermined area in the flat region of the can end to take up metal slack in the can end. Can end presses for performing the above-described operations have long been used in the art. U.S. Pat. No. 4,608,843 of Grims, issued Sep. 2, 1986, for CONVERSION DIE WITH DOUBLE END SENSOR describes the general operation of a prior art can end press and is hereby specifically incorporated by reference for all that it discloses. U.S. patent application Ser. No. 219,046 of Castor et al. for CAN END TAB SENSING APPARATUS, filed Jul. 14, 1988, now U.S. Pat. No. 4,932,823, describes an end press testing station and is hereby specifically incorporated by reference for all that it discloses.

A typical prior art can end press includes a stationary press frame having a lower bed portion and a upper crown portion positioned in spaced relationship and fixedly attached to one another at four corner portions thereof by four stationary frame post members. A fixed lower die is attached to the press bed and a reciprocally movable upper die is attached to the press crown. During a press operating stroke, the upper die is moved toward the lower die portion. A plurality of operating stations are provided with upper tool portions of each operating station mounted on the upper die and lower tool portions mounted on the lower die. During a press operating stroke, an upper die tool portion is moved into contacting engagement with a can end mounted on a lower tool portion of the associated press operating station. The operating stations are arranged in linear alignment, and can ends are moved from one operating station to the next between die press strokes by a transfer assembly.

A continuing problem in can end production has been the occurrence of abnormal press operating conditions which cause can end defects. Typical defects include: excessive scoring of the metal which produces can end leaks; improper rivet formation which may result in can end leaks or improper tab attachment; improper debossing which may result in printed matter on the can end being of insufficient depth to be readable or of excessive depth and causing rupture of the can end; etc. Typical causes of abnormal press operation include: metal scrap in one or more of the press operating stations; tool wear in one or more of the press operating stations; wear in press stop blocks (which are typically provided on a press to precisely limit the movement of the upper die portion during a press operating stroke); changes in metal blank thickness or hardness; etc.

Prior to the present invention, it was known to mount strain gauges on the four stationary press frame posts for the purpose of detecting gross press overloading. However, prior to the present invention, no method existed for determining the existence of abnormal operating conditions associated with the production of defective can ends other than random monitoring of can ends subsequent to end press conversion for product defects. A problem with such random monitoring when an abnormal operating condition exists for only a relatively few number of press strokes is that the defective can ends produced during the short duration abnormal operation may not be among those which are actually examined. Another problem with random defect monitoring is that many of the can end defects are difficult to detect even when a defective end is examined. Another problem with random monitoring is that, even when a defective can end is detected, it is generally unclear, from the mere discovery of the defective end, exactly when the abnormal operating condition which caused the can defect occurred. Thus it is often necessary to dispose of many can ends which are not defective or to conduct time-consuming and expensive examination of many batches of can ends in order to ensure that defective can ends produced during the abnormal operating condition are not used in subsequent production steps. Yet another problem with existing can end quality control operations is that the cause of an abnormal press operating condition, and thus the method for correcting the abnormal operating condition, may not be readily apparent to a press operator from the nature of a discovered can end defect.

OBJECTS OF THE INVENTION

It is an object of the present invention to provide a can end press monitoring and control assembly which immediately identifies an abnormal operating condition of the press associated with the production of defective can ends.

It is another object of the present invention to provide a can end press monitoring and control assembly which, subsequent to the detection of an abnormal press operating condition: (1) identifies the abnormal press operating condition; and/or (2) identifies possible causes of the abnormal press operating condition; and- /or (3) identifies potential product defects associated with the abnormal press operating condition; and/or (4) suggests corrective action to be taken by an operator to eliminate the cause of the abnormal press operating condition; and/or (5) takes direct action on the press and/or associated machinery for removing the cause of the abnormal press operating condition; and/or (6) terminates operation of the press after detection of the abnormal press operating condition; and/or (7) rejects and encodes can ends made during the abnormal press operating condition.

It is another object of the present invention to provide a can end press monitoring and control assembly which identifies abnormal press operating conditions based upon the signal output from strain gauges mounted in one or more of the press operating station tool assemblies.

It is another object of the present invention to provide a can end press monitoring and control assembly which identifies abnormal press operating conditions based upon the signal output from strain gauges associated with press stop blocks.

It is another object of the present invention to provide a can end press monitoring and control assembly which identifies abnormal press operating conditions based upon the signal output from strain gauges associated with the press frame.

SUMMARY OF THE INVENTION

The present invention may comprise a method for modifying a lower base member of a progressive press station for enabling accurate load sensing in the press station wherein the unmodified lower base member comprises a generally cylindrical, tool supporting, upper portion and comprises a lower attachment plate portion integrally formed with said upper cylindrical portion which is adapted for mounting said lower base member on a lower press shoe, said lower attachment plate portion having a lower base dowel pin bore extending therethrough in coaxial relationship with a central longitudinal axis of said upper cylindrical portion; said lower base member being located on said lower press shoe by an original dowel pin received in said lower base dowel pin bore and in an oppositely positioned dowel pin bore in said lower press shoe, the method comprising the steps of: (a) radially and axially enlarging said lower base dowel pin bore whereby said enlarged bore extends axially into said generally cylindrical portion of said lower base member; (b) machiningly reducing the diameter of said upper cylindrical portion of said lower base member in an axial region thereof position radially opposite a portion of said enlarged dowel pin bore; and (c) mounting a transducer on an axially extending surface of said upper cylindrical portion of said lower base member in an axial region thereof containing said enlarged dowel pin bore and said diametric reduction.

The invention may also comprise a method for mounting a transducer assembly on a cylindrical portion of a base member of a progressive can end press comprising the steps of: (a) providing a circumferential recess in a selected axial region of the cylindrical portion; (b) mounting a transducer assembly on the base member in the circumferential recess; and (c) filling the circumferential recess with a sealing matrix material.

The invention may also comprise in a progressive can end press, a die base member and transducer assembly comprising: (a) a base member comprising a generally cylindrical upper portion having an upper cylindrical region of a first diameter and a lower cylindrical region of a second diameter smaller than said first diameter, said lower cylindrical region having a radial bore extending therethrough; (b) a transducer assembly mounted on a sidewall surface of said lower cylindrical region and having a lead wire attached thereto which is received in said radial bore in said lower cylindrical region; and (c) a matrix material provided in a ring about said lower cylindrical region in covering relationship with said transducer assembly.

The invention may also comprise: in a progressive die can end press, a stop block and transducer mounting assembly comprising: (a) a generally parallelepiped-shaped stop block member; (b) a first radial bore extending through said stop block member and having a generally cylindrical bore defining surface; (c) a transducer assembly mounted on said bore defining surface; (d) an axial bore extending through said stop block member and intersecting said first radial bore; (e) a second radial bore of smaller diameter than said first radial bore intersecting said axial bore and intersecting a sidewall surface of said stop block member; (f) an electrical lead attached to said transducer assembly and extending through said axial bore and said second radial bore; and (g) an axial bolt head countersink bore extending through said stop block member to a location between said first radial bore and a lower end portion of said stop block member whereby a bolt received in said countersink bore and used to attach said stop block member to a die shoe does not compress said stop block member in the axial region thereof where said first radially extending bore is located The invention may also comprise in a can end press, a stop block and transducer assembly comprising: (a) a generally cylindrically-shaped stop block member comprising an upper portion; a middle portion having a diameter less than said upper portion; and a lower portion having a diameter equal to that of said upper portion; (b) a transducer assembly mounted on a sidewall surface of said middle portion; (c) a transverse bore extending through said lower portion; (d) an axially extending groove in said lower portion extending from said middle portion to a terminal end of said transverse bore; (e) an electrical lead connected to said transducer and extending through said groove and said transverse bore; and (f) an axial bolt head countersink bore extending from an upper end of said block member to a position below the mounting point of said transducer assembly.

BRIEF DESCRIPTION OF THE DRAWING

An illustrative and presently preferred embodiment of the invention is shown in the accompanying drawings in which:

FIG. 5 is an exploded, partially cut away view of a lower tool portion of a single operating station of a can end press.

FIG. 5A is a blow up of a partially cut away strain gauge mounting member shown in FIG. 5.

FIG. 8 is a schematic view illustrating the inputs, outputs, and basic operation of a data processing assembly.

FIG. 11 is an exploded perspective view of a lower base plate and transducer assembly for use in a Bruderer-type can end press.

FIG. 12 is a top plan view of a lower portion of a Bruderer-type can end press with modified lower base members and lower stop block members.

DETAILED DESCRIPTION OF THE INVENTION

Figure 1:
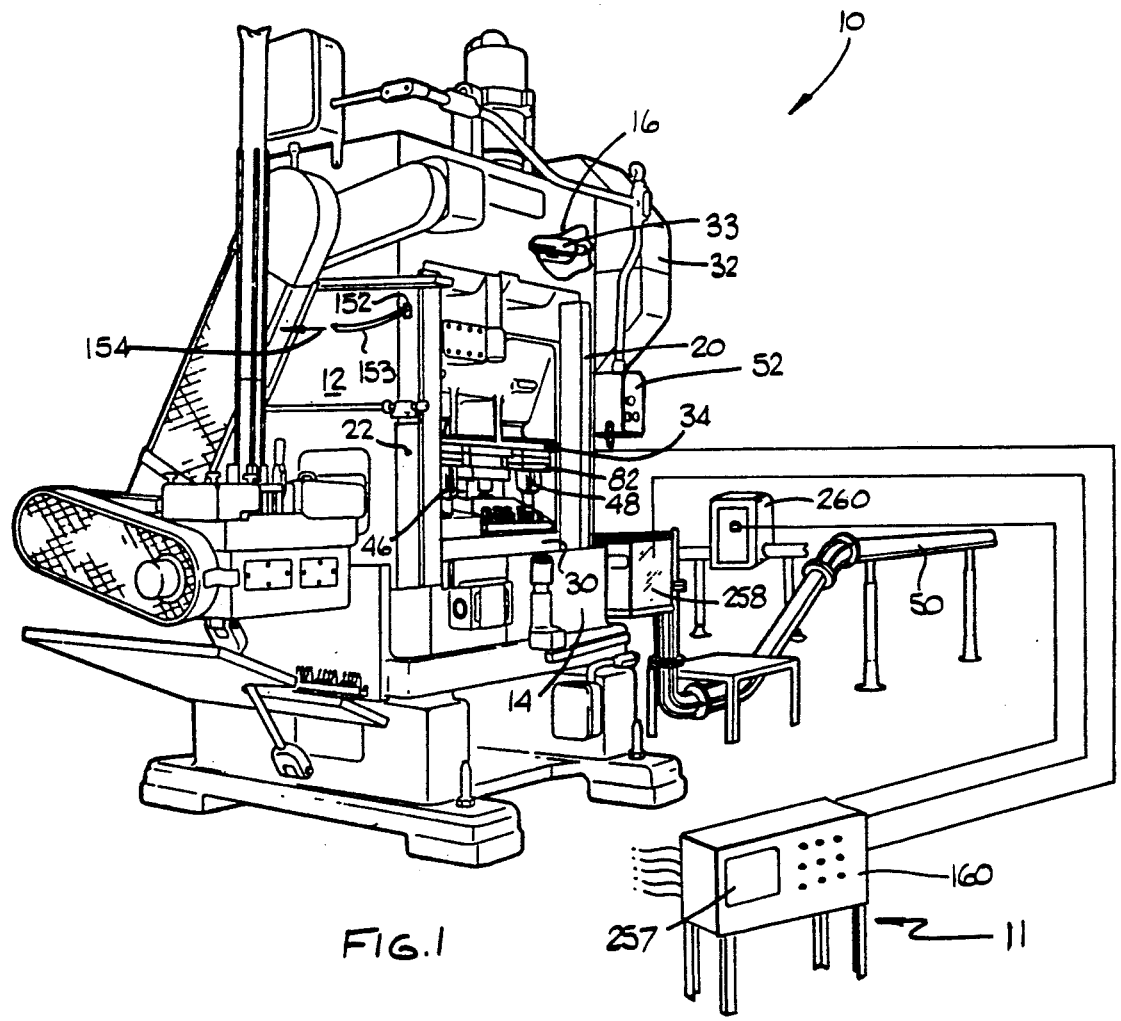
FIG. 1 is a perspective view of a can end press equipped with a monitoring and control assembly.
Figure 6:
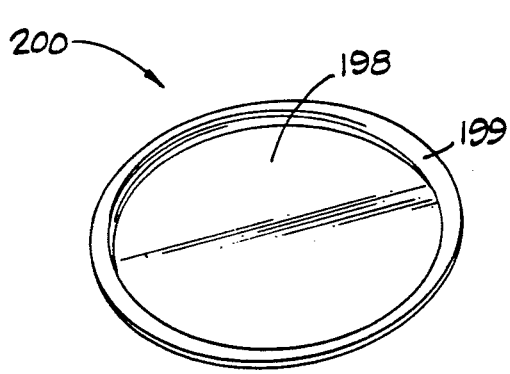
FIG. 6 is a perspective view of a can end blank.
Figure 2:
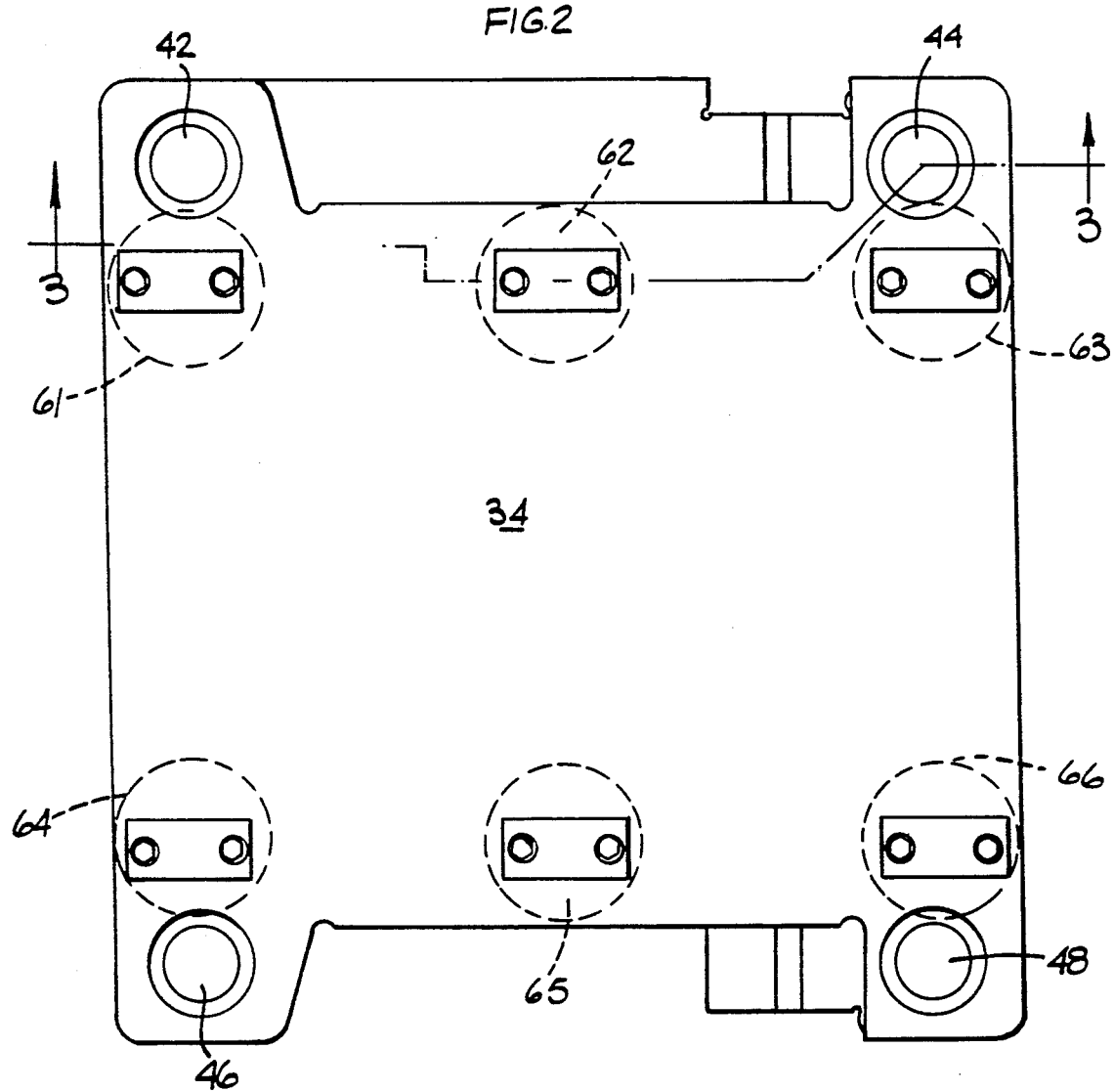
FIG. 2 is a plan view of a can end press upper die shoe.
Figure 3:
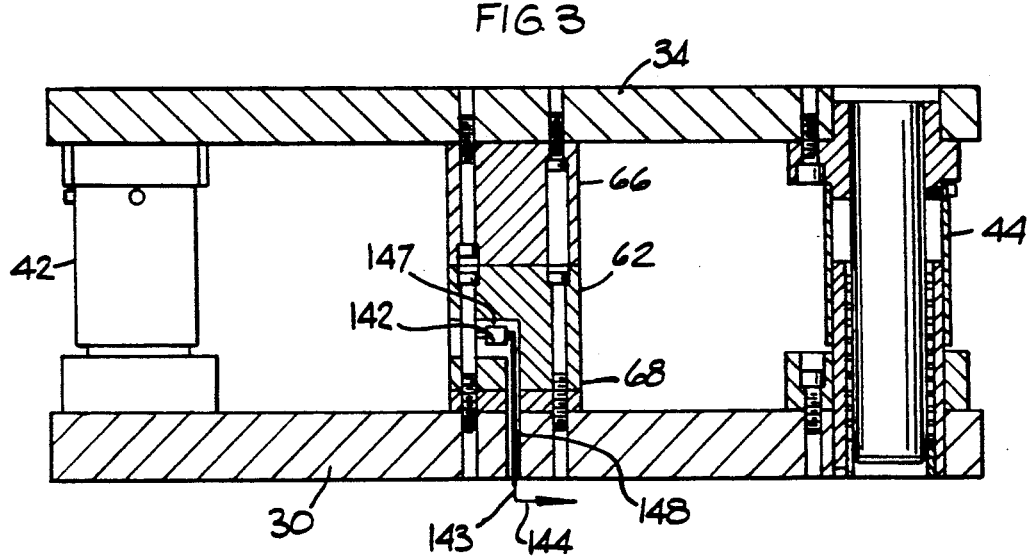
FIG. 3 is a cross sectional view of a can end press upper die shoe, lower die shoe, guide post assemblies, and stop block assembly.
Figure 4:
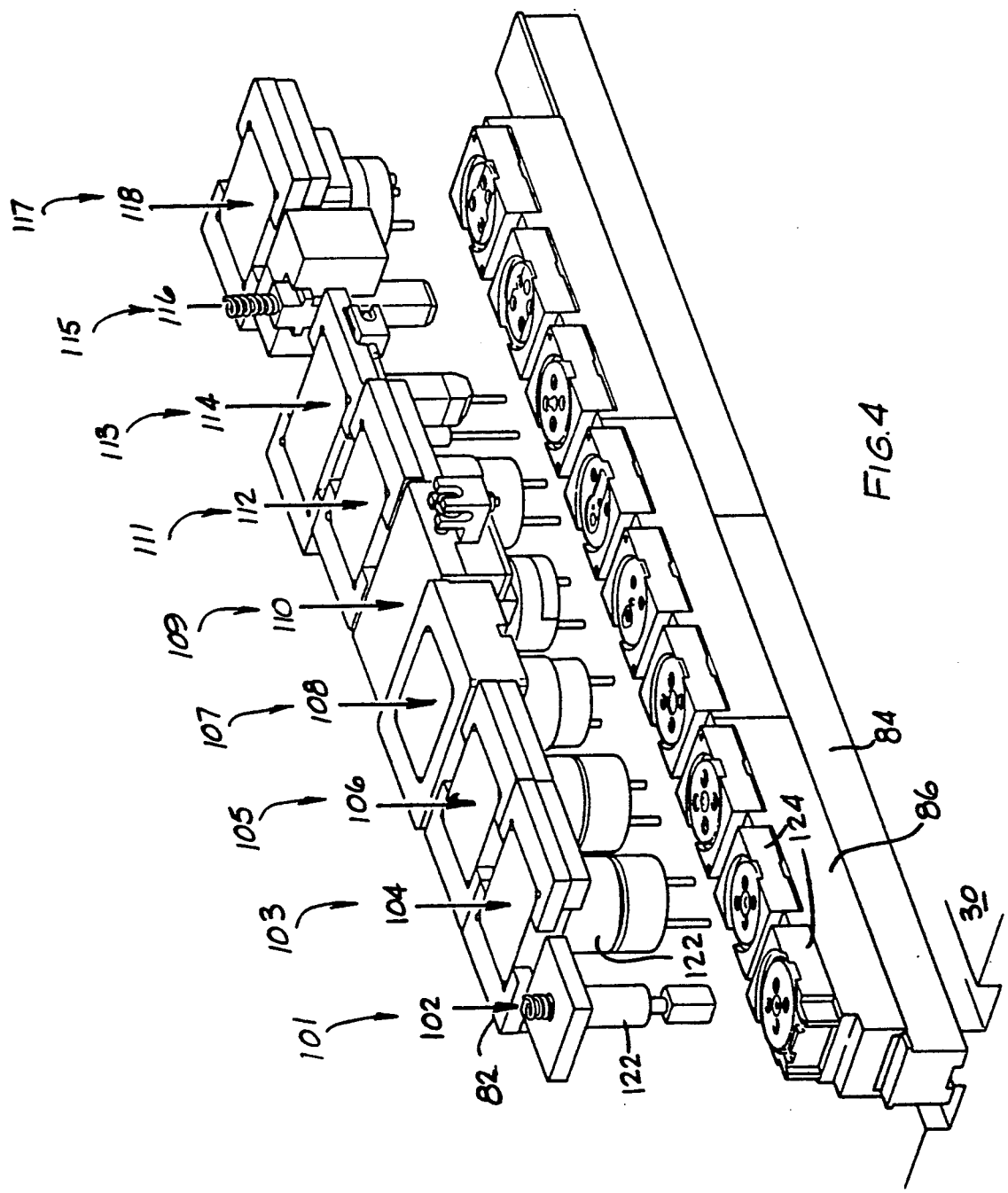
FIG. 4 is a perspective view of a plurality of operating stations of a can end press.

In general, the present invention is directed to a control assembly 11 for use in monitoring and controlling the operation of a can end press 10, FIG. 1. The press may be of a conventional type including: a stationary press frame 12 including a stationary bed 14, a stationary crown 16 positioned above the bed in spaced relationship therefrom, and four stationary frame post members 20, 22 (only two shown) fixedly attached at opposite ends thereof to the corners of the bed 14 and crown 16. A lower die shoe 30, FIGS. 1, 3 and 4, is fixedly attached to an upper portion of the bed 14. A drive motor unit 32, FIG. 1 is connected to a drive shaft 33 rotatably mounted in the crown 16. An upper die shoe 34, FIGS. 1–3, is operably connected to the drive shaft 33 and is vertically, reciprocally movable relative the lower die shoe 30 through rotation of the drive shaft. Four guide post assemblies 42, 44, 46, 48, FIGS. 2 and 3, are operably connected between the upper die shoe 34 and the lower die shoe 30 for maintaining the upper die shoe 34 in alignment with the lower die shoe 30. Two stop block assemblies 62, 64 are provided, each having an upper portion 66 connected to the upper die shoe 34 and a lower portion 68 connected to the lower die shoe 30 for limiting the downward movement of the upper die shoe. An upper chase 82, FIGS. 1 and 4, is fixedly mounted on a lower portion of the upper die shoe 34. A lower die base 84 is fixedly attached to an upper portion of the lower die shoe 30. A lower chase 86 is fixedly attached to an upper portion of the lower die base 84. A plurality of operating station assemblies 102, 104, 106, etc., FIG. 4, are positioned at longitudinally spaced operating stations 101, 103, 105, etc., along the chases for performing different operations on a can end 200, FIG. 6, as it moves from station to station. Each operating station assembly comprises an upper tool portion 122, FIG. 4, fixedly associated with the upper chase 34 and a lower tool portion 124 fixedly associated with the lower chase 86. Converted can ends 202 are discharged from the press 10 into a stacking assembly 50. The press may be switched on and off at an on/off and speed control box 52.

The press monitoring and control apparatus 11 may comprise first strain gauge means 132, FIG. 5, operatively associated with at least one operating station assembly for sensing the force exerted on the lower tool portion 124 by an associated upper tool portion 122 and for providing an operating station force signal 134 indicative thereof; second strain gauge means 142, FIG. 3, operatively associated with at least one of the stop block assemblies 62, 64 for sensing the force exerted on the stop block lower portion 68 by the stop block upper portion 66 and for providing a stop block force signal 144 indicative thereof; third strain gauge means 152, FIG. 1, operatively associated with at least one of the press frame post members 20, 22, etc., for detecting the force exerted through the frame post members between the press crown 16 and the press bed 14 and for providing a press frame force signal 154 indicative thereof; and data processing means 160, FIGS. 1 and 8, for receiving the force sensing signals and for comparing the signals to predetermined criteria for detecting at least one abnormal operating state of the press and for determining the cause of the abnormal operating state; and for providing a human-readable message indicative of the cause and/or indicative of corrective action to be taken to return the can end press to a normal operating state, and/or for initiating an appropriate system response to the abnormal condition. Such a system response may include: rejection of can ends produced during the abnormal operating condition and coding of the rejected can ends; automatic adjustment of the press to correct the cause of the abnormal operation; and/or termination of press operation.

Figure 7:
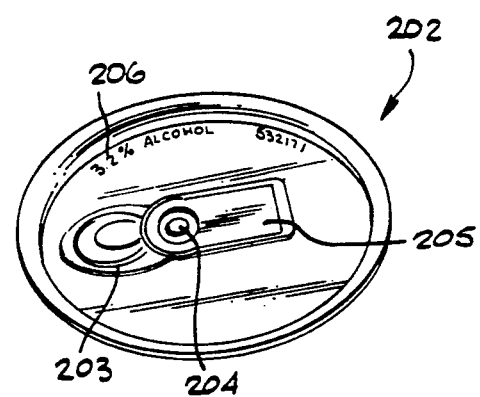
FIG. 7 is a perspective view of a converted can end.

Having thus described the invention in general, the invention will now be described in further detail. FIG. 4 illustrates the construction and arrangement of stations on a typical can end press such as, for example, a Bliss SOT Conversion Press press manufactured by Gulf Western Products Co. A can end blank 200, FIG. 6, which may be of the type described in detail in U.S. Pat. No. 4,608,843 of Conrad Martin Grims (which is hereby specifically incorporated by reference for all that it discloses) having a flat central portion 198 and a generally upwardly projecting rim portion 199, passes sequentially from station to station between press strokes and has a different sensing operation or work operation performed thereon at each station A can end which has passed through the press, hereinafter sometimes referred to as a converted can end 202, FIG. 7, typically comprises a scored portion 203 which provides a weakened zone on the can end for enabling rupture thereof to provide a can end opening; a can end rivet 204 formed from the can end blank 200 and adapted to secure a separate can end tab 205 thereto; and various printed indicia 206 which is embossed in the generally planar, central, upper surface of the can end.

The entry station of the press is an end sensor station 101, FIG. 4, at which is located an end sensor assembly 102 which is adapted to sense the presence or absence of a can end entering the press. If no can end 200 is detected at this first station, then operation of the press is automatically terminated to prevent damage to the downstream operating assemblies.

The next press station 103 is provided with a bubble-down assembly 104 which creates a downwardly depending bubble in the center of the otherwise flat central portion 198 of a can end 200 as an initial step in rivet-forming process. It has been discovered by applicant that the detection of abnormally high loads in this press station may be caused by: latex smear on the can end surface; a "double end" (two can ends stacked one on top of the other rather than a single can end); or metal and/or paper scrap in the die; or a mislocated end. A typical product defect which is associated with such high loading in the die is a weakened or fractured rivet in the converted can end 202 which may produce a leaking can.

The next die station is a bubble-up station 105 with associated bubble-up assembly 106 which is adapted to invert the bubble formed at the bubble-down station 103. High loading in this station may be caused by the same problem as discussed above with respect to the bubble-down station Defects associated with high loading in this station include rivet diameter variations, changes in rivet residual (metal thickness), rivet fracture (resulting in leaking cans), and rivet tear-out (resulting in tabs coming loose or being detached from the can end).

At the next die station 107, an embossing assembly 108 is provided for forming printed matter 206 and the like on the upper surface of the can end and to perform a bubble rehit. At the embossing assembly, a portion of the upper die tool is urged against the upper surface of the can end mounted on the lower die tool to stamp printed matter, etc, onto the can end. The same die tool also has an upper tool surface which strikes the area surrounding the bubble to provide a proper bubble base radius contour. High loading in this station may be caused by the same causes as mentioned above with respect to the other stations Product defects associated with high loading in this station include deviations in the depth of printing on the can top and defective rivet formation.

The next press station 109 is provided with a score assembly 110 for scoring the upper surface of the can end to provide a weakened area for subsequent rupture by a consumer for forming an opening in the can end. High loading in this station may also be produced by latex smear, a double can end, or metal scrap in the die. Resulting can defects associated with such high loading include a change in score residual—a greater residual resulting in a can end which is difficult to open, a lower residual resulting in a can end which is extremely easy to open, and/or a premature rupture and leaking of beverage through the can end. Another related defect is uneven scoring which may also affect the opening characteristics of the can end and which may cause premature rupturing and leaking of the can formed with the associated converted can end.

The next press station 111 is provided with a debossing assembly 112 which acts against a lower surface of the can end to cause the production of a surface depression generally in the area of the can end around the score, to remove slack metal from the can end. An increased loading in this die station may be caused by the same causes as discussed above with the other die stations. Product defects associated with high loading in this station include score fractures causing leaking in subsequently formed cans.

The next press station 113 is provided with a tab inserting and final staking assembly 114 which causes a tab to be mounted on the upwardly extending bubble formed at the bubble-up assembly and which subsequently causes the bubble to be flattened to form the rivet 204 which holds the tab 205 in place on the can end. High loading in this station may be associated with scrap in die, misadjustment of the press and improper rivet bubble formation. Product defects caused by high loading in the tab insert and final staking station 113 include fractured rivets and low rivet residual.

The next station 115 is provided with a no-tab detection assembly 116 which detects the presence or absence of a tab for verifying tab staking. This station is ordinarily a non-metal-forming station and thus is not a cause of product defects.

The next station 117 having an assembly 118 is an idle station. This station, like the no-tab detector station 115 does not perform work on the can end and thus is not a source of can end defects The mounting of a sensor 132 in a lower chase 86 of a typical die assembly, in this case the score assembly 110, is illustrated in FIG. 5. The score assembly lower tool portion comprises an anvil 126, a centering pin 127, a spring 128, a die center spacer 129, an end contour block 130, a dowel pin 135, a spring cup 136, and a spring 137. The die center spacer 129 is received within a lower chase bore 138. The die center spacer 129 in a convention press is ordinarily mounted on a horizontal surface provided at the bottom of chase bore 138. However, in one preferred embodiment of the present invention, the chase bore 138 is extended entirely through the lower chase 86 and a specially designed strain gauge mounting member 170 is provided which is insertable into the chase bore and which is supported on the upper surface of the press lower die shoe 30, FIG. 4, which also supports the lower chase 86.

The enlarged press bore 138 comprises an upper, smaller diameter portion 139 and a lower, larger diameter portion 141 and is adapted to receive the strain gauge mounting member 170 in close fitting relationship therein. The strain gauge mounting member 170 comprises an upper cylindrical portion 172 (which may be, e.g., 1.7 inches in diameter and 0.6 inches in height) and a lower cylindrical portion 174 (which may be, e.g., 1.9 inches in diameter and have a height of 0.15 inches). The upper portion 172 of the strain gauge mounting member is received in a lower portion of the chase bore upper portion 141. The lower portion 174 of the strain gauge mounting member is received in the chase bore lower portion 143. The strain gauge mounting member upper portion 172 has an axially centered annular groove 176 provided therein (which may have an axial dimension of 0.4 inches and a radial dimension of 0.15 inches). Strain gauge 132 is mounted on an axially and circumferentially extending surface 178 of the groove. A strain gauge lead 133 extends through a radial bore 180 and an axial bore 182 in the member and emerges from the bottom of member 170. The lead may further extends through a bore (not shown) in the lower press shoe 30 and is ultimately connected to data processing unit 160. The strain gauge mounting member annular groove 176 may be filled with epoxy 190 subsequent to mounting of the strain gauge 132 therein to protect the strain gauge from press fluids, etc. The strain gauge mounting member is adapted to have center spacer 129 bolted to an upper surface 186 thereof. Axial loading of the score assembly anvil 126 is thus transmitted through center spacer 129 to strain gauge supporting member 170. Strain gauge 132 provides a signal 134 indicative to this axial loading. Each of the die station assemblies 104, 106, 108, 110, 112, and 114 comprise a strain gauge mounting member 172 having a strain gauge 132 mounted thereon identically as described above with respect to the scoring assembly 110 lower tool portion 124. Each of these strain gauges is operably connected to the data processing apparatus 160. Each sensor 132 may be a conventional strain gauge such as Model 125AD manufactured by Measurements Group, Inc., of P.O. Box 27777, Raleigh, North Carolina, 27611.

As illustrated in FIG. 3, each of the stop block assemblies 61, 62, 63, 64, 65, 66 have a sensor 142 mounted thereon for detecting the axial loading therein In one preferred embodiment, each sensor 142 is mounted on an axially and extending surface portion of a radial bore 147 provided in the lower portion 68 of each stop block assembly. A sensor lead 143 is operably connected to the sensor 142 and extends through the radial bore 147 and an axial bore 148 which communicates with the radial bore 147. The axial bore extends through the stop block lower portion 68 and the lower die shoe 30 upon which it is mounted The lead 143 is connected to data processing unit 160. Sensor 142 may be a conventional strain gauge which may be identical to strain gauge 132

An increase in axial loading in the stop blocks may be indicative of the fact that the press has heated up and expanded, effectively decreasing the length of each press stroke. An increase in axial loading in the stop blocks may also be indicative of scrap in the stop blocks. A decrease in the axial loading in the stop blocks may be associated with an increased loading in the die stations which may be caused by any of the above-described problem conditions or, perhaps, other conditions. A gradually decreasing loading in the stop blocks may be expected over a period of time, e.g. several months, in association with stop block wear.

Figure 9:
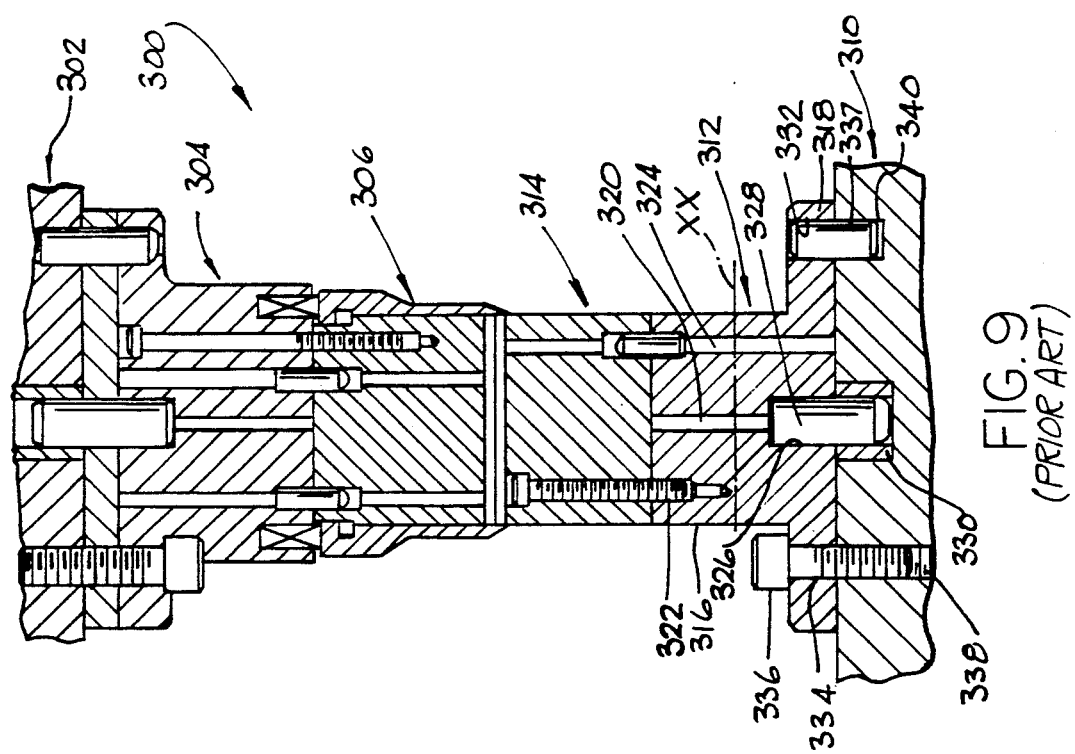
FIG. 9 is a cross sectional elevation view of an operating station of a Bruderer-type can end press.

As illustrated in FIG. 1, frame sensors 152 may be conventionally mounted for detecting axial forces in each of the four frame post members through mounting of a conventional strain gauge on a surface portion of each frame member. The strain gauges mounted on the frame may be conventional strain gauges such as 132, 142 described above. The strain gauges 152 are provided with conventional leads 153 which are operably connected to the data processing unit 160. The loading in the press frame is proportionate to the total of the loading in the various press stations and stop blocks plus friction loading and thus the total press frame load signal may act as a base reference in determining whether deviations, say, in a particular station are caused by a problem in that particular station or are rather associated with an increased loading in the entire press A schematic rendering of the operation of a data processing unit 160 is illustrated in FIG. 9 for a system having N strain gauges which may include die press operating strain gauges 132, stop block strain gauges 142, and press frame strain gauges 152. For ease of explanation, a relatively simple system operation will first be described in which the data processing unit 160 receives force signals from only strain gauges 132A, 132B, etc. associated with the press operating stations Force signals transmitted by these strain gauges are initially processed by a signal processor 250 which is adapted to convert the analog signal received from each strain gauge into a multiple value digital signal indicative of the high and low point of each strain gauge wave form signal and also indicative of the average value of the wave form signal. Signal processing units having the characteristics described for unit 250 are well-known in the art and commercially available, such as, for example, the Toledo Box Model N268 manufactured by Toledo Transducer, Inc., having an address of 3525 Monroe Street, Toledo, Ohio, 43606.

The digitized high/low data values associated with each strain gauge signal are sent to a threshold comparator unit 252 which compares the value of the signal currently being produced by each strain gauge to preset high and low threshold values associated with malfunction of the associated die press station The threshold comparator 252 may be a 80386 microcomputer equipped with conventional comparator software or may alternately be a conventional comparator circuit of a type familiar to those having skill in the art, such as a Voltage Comparator Chip Model LM 306 manufactured by National Semiconductor Corp. of 2900 Semiconductor Drive, Santa Clara, California, 95051. It has been discovered that these high and low threshold values associated with press malfunction will vary over time depending upon press operating conditions such as press temperature, the thickness of metal in a particular batch of can ends, etc.

In order to take into consideration these changing operating conditions and the associated change in malfunction threshold values, the processed signals from the signal processor 250 are sent to a threshold calculator 254 which periodically, e.g. every 15 seconds recalculates the threshold value for each strain gauge based upon a statistical analysis of the strain gauge signal received from signal processor 250. More specifically, the threshold calculation may be based upon a three standard deviation statistical analysis. Such threshold calculation may be performed, for example, by an Intel 80386 chip based microcomputer using a standard statistical analysis software package such as Asyst which is commercially available from Asyst Software Technologies, Inc., of Rochester, New York, 14623.

The threshold comparator 252 sends a signal to a threshold violation response determination unit 256 which provides appropriate responses to an indication that a strain gauge signal has violated its associated threshold values. In its simplest form, the threshold violation response unit 256 may simply be an on/off switch which is actuated to terminate the operation of the press in response to an indication that any of the strain gauge signals are in violation of its current threshold values. In addition to the direct response which unit 256 performs on the system, or instead of such a response, the unit 256 may provide a human-readable display message, e.g. on a CRT 257 or on a printer paper printout which indicates the nature of the abnormal operation and suggests corrective action to the press operator. For example, the control system may terminate press operation in response to a signal from the scoring station in excess of its threshold value and may display the following message: "The scoring assembly is operating above its normal loading conditions. Look for scrap in the scoring station. Remove the last 10 can ends produced by the press and all ends remaining in the press and send to quality control along with this message for product defect analysis. Time: 10:42 Date 10/15/90"

In a still more sophisticated version of the invention, the threshold violation response may be to take relatively more complex direct action in addition to providing a human-readable message indicating the nature of the action. For example, in response to the detection of one-time violation of threshold values in each of the press stations in sequence, the unit 256 may provide a message: "All press stations have exceeded normal loading ranges one time during sequential press strokes. Possible problem is a double can end passing through the press." At the same time a converted end rejection mechanism 258, FIGS. 1 and 9, may be actuated to reject the single can end associated with the excess loading of the press stations, and, in addition, a rejected end coding mechanism 260 may be actuated to encode the rejected end with information indicative of the time and/or the nature of the abnormality which resulted in the rejection. The press rejection mechanism may be a conventional rejection mechanism which is available on many prior art presses, such as that manufactured under the product name Proline Impulse Rejector, manufactured by Industrial Dynamics Co. of 2927 Lomita Blvd., Torrance, California, 90509-2945. The rejected part coding mechanism may be a conventional ink jet part coding device such as that sold under the product name Solo 4, manufactured by Domino Amjet, Inc. of 1305 Dugdale Road, Wakegan, Illinois, 60085.

In order to perform the above type operations, the software or circuitry provided in the threshold violation response unit 256 may be relatively simple, as in the case where the response is simply termination of the press in response to a violation of any threshold value of any strain gauge. Or the software/circuitry may be quite complex and may involve an analysis and sorting of data beyond simple threshold violation data. For example, the magnitude of threshold violations may be taken into account; the sequence in which thresholds are violated may be taken into account; other press variables such as the values of the stop block strain gauge signals, the press frame strain gauge signals, the speed of press operation, the temperature of the press, etc., may be taken into account and analyzed collectively based upon various criteria associated with the causes of abnormal operation for determining: (1) whether press operation is normal or abnormal; (2) the type of abnormal operation; (3) the probable cause of any abnormal operation; and (4) the correct system response.

In a still more sophisticated version of the invention, an interactive system is provided which ma request additional information from a human operator when necessary to provide the further data needed to properly analyze an abnormal operation and to provide the appropriate human readable messages and/or corrective response, etc.

FIG. 9 is a cross sectional view of an operating station of a prior art Bruderer-type can end press such as sold under the model designation Stolle-Bruderer System Seven by the Stolle Corporation, 1501 Michigan St., Sidney, Ohio, 45365. An upper die shoe 302 supports an upper base member 304 which, in turn, supports an upper die tool 306. A lower die shoe 310 supports a lower base member 312 which, in turn, supports a lower tool 314. Lower base 312 comprises an upper cylindrical portion 316 which may have an axial length of 1.375 inches and a diameter of 1.936 inches. A toolmaker's reference bore 320 is provided at the center of the upper cylindrical point and a plurality of tool attachment bores 322 are provided at other locations on the upper cylindrical portion. The cross sectional area for any axial location on the upper cylindrical portion 316, e.g. at plane XX, is no more than 3.53 square inches, taking into account the various bores extending through the upper cylindrical portion.

The lower base also comprises a lower attachment plate portion 318 which is integrally formed with the upper cylindrical portion 316. The lower attachment plate may comprise an axial dimension of 0.50 inches. A dowel pin bore 326 which may have a diameter of 0.5001 inches is provided in the attachment plate portion in coaxial relationship with the toolmaker's reference bore 320. The axial length of the dowel pin bore may be approximately 0.5 inches. A generally cylindrical dowel pin 328 is adapted to be received in dowel pin bore 326 and an associated dowel pin hole 330 in the lower die shoe 310. The die shoe dowel pin bore may be equal in diameter to the dowel pin bore in the lower base member. The dowel pin has a diameter 05 slightly less than that of the dowel pin bores 326, 330, e.g. 0.5000 inches, which allows it to be closely slidingly received in bores 326, 330. Other pin/bolt bores 332, 334 in the lower plate portion are adapted to receive attachment bolts 336 and pins 337 which are also receivable within threaded and unthreaded bores 338, 340, etc., in the lower die shoe for securing the lower base member 312 to the lower die shoe 310.

Figure 10:
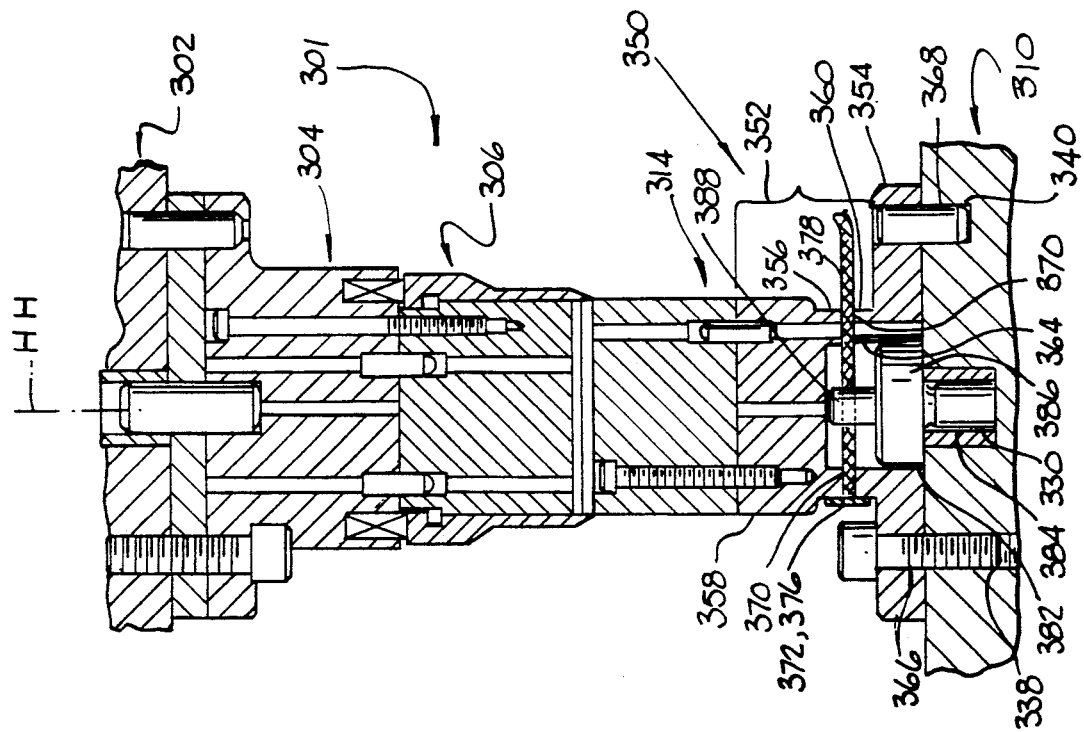
FIG. 10 is a cross sectional elevation view of a modified operating station for a Bruderer-type can end press.

FIG. 10 illustrates a modified press station assembly 301 having an upper die shoe 302, a base member 304, an upper die tool 306, a lower die shoe 310, and a lower tool 314 which are identical to those of prior art press station assembly 300 described with reference to FIG. 9. However, a modified lower die base 350 is provided in the press station assembly 301 which is particularly adapted for use with a transducer assembly 372.

As illustrated by FIGS. 10 and 11, the modified lower die base 350 which comprises a central longitudinal axis HH includes an upper, generally cylindrical portion 352 and a lower plate portion 354. The upper, generally cylindrical portion 352 may comprise the same axial length as prior art cylindrical portion 316 of lower base 318 and may comprise the same diameter as prior art cylindrical portion 316 at the upper end thereof. However, a circumferential channel 356 which may have an axial dimension of 0.625 inches is provided in the lowermost region of the upper, generally cylindrical portion 352 of modified lower die base 350. The circumferential channel 356 thus divides the upper, generally cylindrical portion 352 into an upper, larger diameter region 358 which may have a diameter of 1.936 inches, and a lower, smaller diameter region 360 which may have a diameter of 1.907 inches.

An enlarged dowel pin bore 364, which may have a diameter of 1.2500 inches and an axial length of 1.000 inches, extends upwardly from the bottom of the modified lower die base 354 in coaxial relationship with central longitudinal axis HH. As with the prior art die base, bolt/pin bores 366, 368, etc., are provided for enabling attachment of the die base to lower die shoe 310.

A transverse bore 370, which may be located axially at the center of lower, smaller diameter region 360, extends through the entire smaller diameter region 360. The transverse bore may be radially offset 0.63 inches from the central longitudinal axis HH of the die base.

A transducer assembly 372 comprising a plurality of strain gauge units 374, 376, etc., FIGS. 10 and 11, is mounted about the periphery of the lower, smaller diameter region 360 for measuring strain therein. The use of strain gauges for measuring strain in members and methods for attaching strain gauge units to the surface of circumferential members is well-known in the art. An electrical lead cable 378 attached to the transducer assembly 372 is extended through transverse bore 370 and is attached to an appropriate signal processing unit such as described below with reference to FIG. 17. A matrix material such as epoxy 380 is used to fill circumferential channel 402 and to cover the the transducer assembly 372, sealingly securing the transducer assembly in fixed relationship with the lower die shoe.

A modified dowel pin 382 is provided having a lower portion which may have an axial length of 0.765 inches and a diameter of 0.500 inches; a middle portion having an axial length of 0.50 inches and a diameter of 1.2500 inches; and an upper portion which may have an axial length of 0.485 inches and a diameter of 0.5000 inches. Lower portion 384 is adapted to be slidingly received in die shoe dowel pin bore 330, middle portion 386 is adapted to be slidingly received in enlarged dowel pin bore 364. Upper portion 388 has an axial length sufficiently small to prevent the dowel pin from making contact with the upper radial surface which defines enlarged dowel pin bore 364. The upper portion 388 is adapted to act as a "stand-off" to prevent crushing of lead cable 378 when the dowel pin is inserted into enlarged dowel pin bore 364 during system assembly.

With the modifications indicated to modified lower die base 350, the total cross sectional area of modified lower die base 350 in an axial region which includes the lower, smaller diameter region 360 of the upper cylindrical portion and which also includes an upper portion of the enlarged dowel pin bore 364 is 46% or roughly half of the maximum cross sectional area of the unmodified lower die base 312. The lower die base, which is constructed from A2 tool steel, R.C. 58-62, having a modulus of elasticity of $2.9 \times 10^6$ psi, is thereby enabled to undergo sufficient strain during press loading cycles to provide an accurate readout for the transducer assembly without being subjected to strains sufficient to cause damage to the modified lower die base. The maximum press load experienced by any can end press station of this type is typically between 600 lbs. and 22,000 lbs., even under abnormal load conditions such as when scrap is present in the die station.

A lower portion 390 of a Bruderer-type press, which has been modified in accordance with the present invention, is illustrated in FIG. 12. The lower press portion 390 comprises a plurality of modified lower die base members 350 mounted on lower die shoe 310. The lower press portion 390 also comprises a plurality of modified lower stop blocks including generally cylindrical lower stop blocks 392 and generally parallelepiped-shaped stop blocks 394 such as illustrated in detail in FIGS. 13-16.

Figure 13:
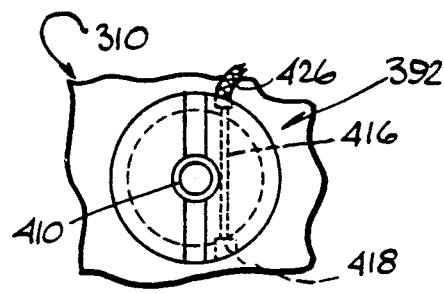
FIG. 13 is a top plan view of a modified cylindrical stop block and transducer assembly for use in a Bruderer-type can end press.
Figure 14:
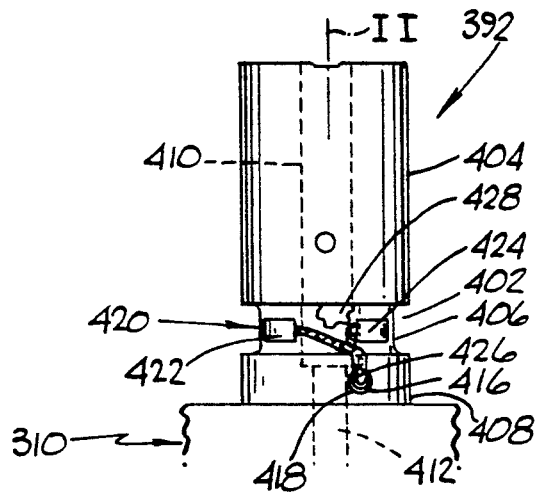
FIG. 14 is an elevation view of the stop block and transducer assembly of FIG. 13.

As illustrated in FIGS. 13 and 14, each lower, generally cylindrical stop block 392 includes a stop block modifying circumferential channel 402 which divides the stop block into an upper cylindrical portion 404, a middle cylindrical portion 406, and a lower cylindrical portion 408. Portion 406, which is defined by circumferential channel 402, may have a diameter of 1.625 inches Upper and lower cylindrical portions 404, 408 may each comprise a diameter of 1.995 inches. A stop block modifying bolt head countersink bore 410, having a diameter of 0.59 inches and an axial length of 3.625 inches, is positioned in coaxial alignment with a bolt-receiving bore 412 having a diameter of 0.41 inches. Countersink bore 410 prevents an attachment bolt (not shown) from straining the stop block in the area in which strain is to be measured and also reduces the cross sectional area of the stop block in the region where strain is to be measured.

A transverse cable-receiving bore 416 having a diameter of 0.109 inches extends entirely through the lower cylindrical region 408 of the stop block. A vertical slot 418 extends from one opening of the bore 416 to circumferential channel 402. A transducer assembly 420 which may comprise a plurality of strain gauges 422, 424, etc., is mounted about the periphery of middle cylindrical portion 406. An electrical lead cable 426 attached to each of the strain gauge units 422, 424, etc., is extended through slot 418 and transverse cable-receiving bore 416. The electrical lead 426 is thereafter connected to an appropriate signal processing unit such as described below with reference to FIG. 17.

A matrix mounting material 428 such as epoxy (shown only in fragment in FIG. 14) is used to cover the transducer assembly 420 and fill the void provided by circumferential channel 402, thereby sealingly holding the transducer assembly 442 in fixed relationship with the stop block.

The total cross sectional reduction provided in the lower, generally cylindrical stop block 392 by countersink 410 and circumferential channel 402 may be approximately 63% of the total cross sectional area of a prior art unmodified lower cylindrical stop block. This modification of stop block area has been determined to be sufficient to provide necessary axial deformation to allow accurate load measurement in a stop block constructed from S2 tool steel, R.C. 50-55, having a modulus of elasticity of $2.9 \times 10^6$ psi for use in association with a Bruderer-type press having maximum press loads in a range of between 0 lbs. and 18,000 lbs. on the cylindrical stop blocks.

Figure 15:
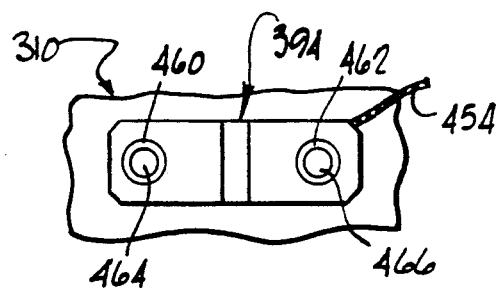
FIG. 15 is a top plan view of a modified lower parallelepiped-shaped stop block and transducer assembly for use in a Bruderer-type can end press.
Figure 16:
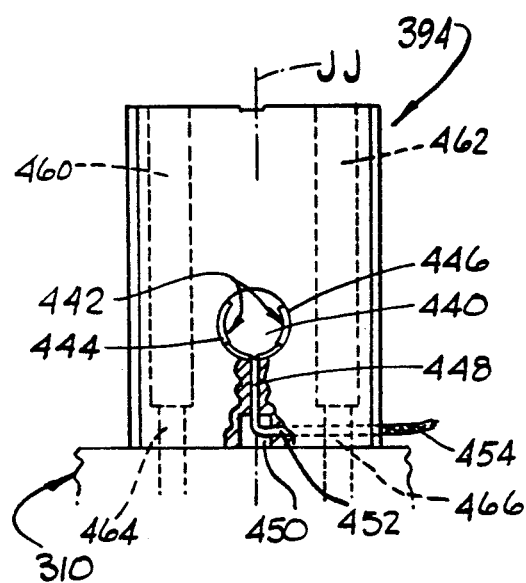
FIG. 16 is an elevation view of the lower stop block and transducer assembly of FIG. 15.

A parallelepiped-shaped lower stop block 394 is shown in detail in FIGS. 15 and 16. Each parallelepiped-shaped lower stop block may comprise a thickness of approximately 1.00 inches, a width of approximately 3.00 inches, and an axial length of approximately 4.125 inches, and may be constructed from S2 tool steel, R.C. 50-55, having a modulus of $2.9 \times 10^6$. The parallelepiped-shaped lower stop block 394 is modified over a prior art stop block by providing a central transverse bore 440 therethrough which may have a diameter of 0.875 inches and by mounting a transducer assembly 442 comprising a plurality of strain gauge units 444, 446, etc., directly on the sidewall of the bore 440. The method for mounting strain gauges in bores for determining strain on an associated member is well-known in the art. Coaxial bores 448, 450 are provided in coaxial relationship with the central longitudinal axis JJ of the stop block. Bore 448 which intersects transverse bore 440 may comprise a diameter of 0.109 inches, and bore 450 may comprise a diameter of 0.37 inches. A transverse bore 452 which may comprise a diameter of 0.109 inches is provided which intersects axial bore 450. Electrical lead cable 454 attached to the strain gauge units 444, 446, etc., is extended through bores 450, 452, 454 and is attached to an appropriate signal processing unit such as described below with reference to FIG. 17.

Counterbores 460, 462 which may have a diameter of 0.50 inches are provided in coaxial relationship with preexisting bolt hole bores 464, 466. The axial length of counterbores 460, 462 may be 3.625 inches, which is sufficiently large to position the shoulder at which bolt heads make compressive contact with the member below the position of transducer assembly 442, thus preventing the compression of the member provided by the associated attachment bolts from interfering with press loading measurements.

The reduction of cross sectional area which is produced by transverse bore 440 and axial countersinks 460, 462 in the region in which strain measurement is made may be approximately 58% of the unmodified cross sectional area of the parallelepiped-shaped stop block member 394. Such an area reduction allows accurate strain measurement without causing strain damage in a block receiving maximum loads of between 0 lbs. and 18,000 lbs. during each press stroke.

Figure 17:
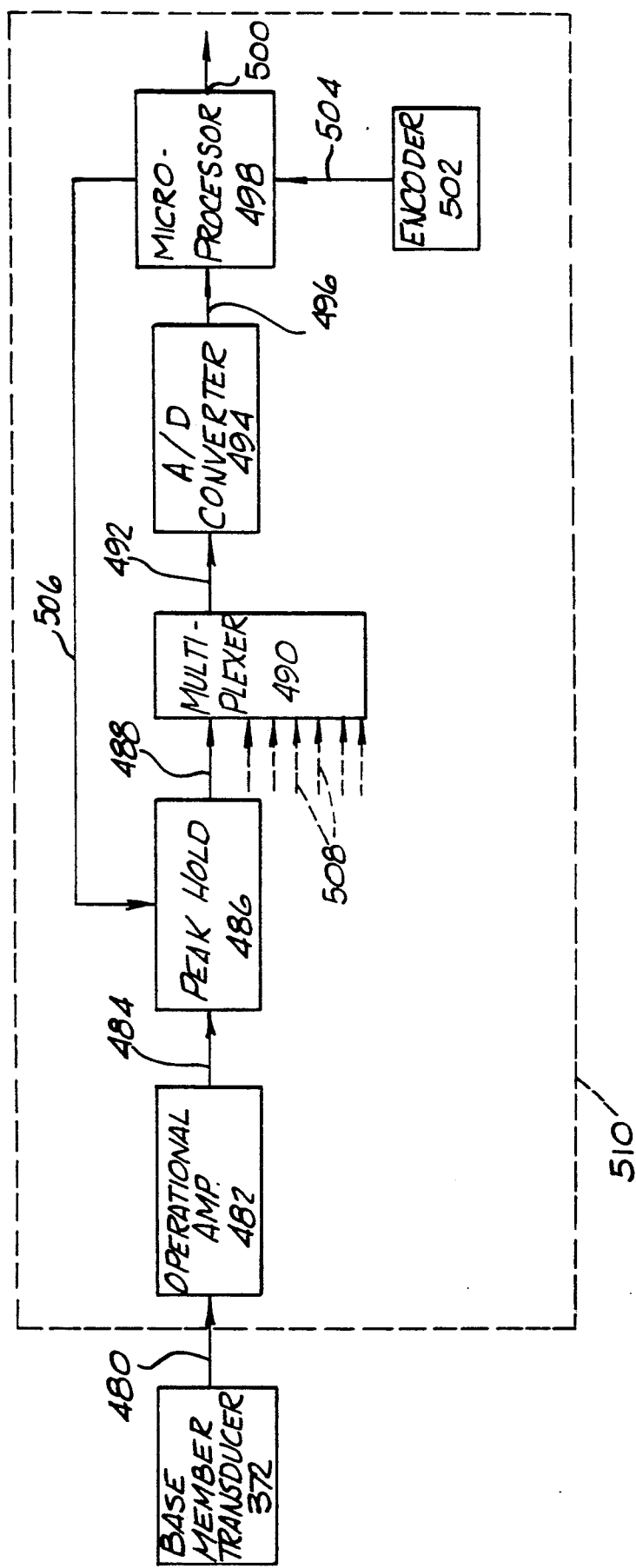
FIG. 17 is a schematic representation of the processing of the strain gauge signal.

Components of a transducer signal processing assembly are illustrated in FIG. 17. As explained above, a different transducer assembly, e.g. 372, is mounted in a die shoe or die base associated with each press station. A different transducer assembly, e.g. 420, may also be mounted on each stop block pair and on each press post. The method by which each transducer signal is processed is identical. The processing of the strain gauge signal in press station 301 is shown in detail in the drawing, FIG. 17.

Transducer assembly 372 produces an analog force signal 480 which is amplified and filtered by operational amplifier (op/amp) 482. Op/amp 482 outputs a conditioned analog signal 484 which is transmitted to a peak hold device 486. Peak hold device 486 "looks at" the analog signal 484 at predetermined sampling intervals and selects the maximum or "peak" signal value during each sapling period. The signal 488 generated by the peak hold 486 is an analog signal representative of the peak value from each sampling interval.

The sampling intervals used by peak hold 486 are set by a sampling timing signal 506 issued by a microprocessor 498. The sampling intervals are set to include the period of each press cycle during which the associated die station (e.g. station 301) is performing work on a can end. Microprocessor 498 determines the sampling intervals based upon press position which is indicated by an encoder signal 504 issued by an encoder 502 mounted on the press crankshaft.

Analog peak signal 488 is input to a multiplexer 490 which multiplexes the signal and outputs a multiplexed analog peak signal 492 to analog-to-digital converter 494. A/D converter 494 outputs a digitized peak signal 496 representative of the value of signal 492 to microprocessor 498. Microprocessor 498 compares the value of peak signal 496 to a predetermined threshold value. If the peak signal exceeds its predetermined threshold value, microprocessor 498 issues a stop signal 500 to terminate operation of the press.

The signals from each of the other transducer assemblies, as indicated at 508, is processed in exactly the same way as described for transducer 372 except that different threshold values may be associated with each of the different transducer signals. Multiplexer 40 enables all of the analog peak signals associated with the different transducer assemblies to be processed by a single A/D converter and a single microprocessor.

A prior art signal processing assembly similar or identical to that indicated within border 510 which is used to process signals from transducers mounted on press frame members is commercially available from Toledo Transducers, Inc., 1560 W. Laskey Rd., Toledo, Ohio, 43612.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A method for modifying a lower base member of a progressive press station for enabling accurate load sensing in the press station wherein an unmodified lower base member comprises a generally cylindrical tool supporting, upper portion and comprises a lower attachment plate portion integrally formed with said upper cylindrical portion which is adapted for mounting said lower base member on a lower press shoe, said lower attachment plate portion having a lower base dowel pin bore extending therethrough in coaxial relationship with a central longitudinal axis of said upper cylindrical portion; said lower base member being located on said lower press shoe by an original dowel pin received in said lower base dowel pin bore and in an oppositely positioned dowel pin bore in said lower press shoe, the method comprising the steps of:
   a) radially and axially enlarging said lower base dowel pin bore whereby said enlarged bore extends axially into said generally cylindrical portion of said lower base member;
   b) machiningly reducing the diameter of said upper cylindrical portion of said lower base member in an axial region thereof positioned radially opposite a portion of said enlarged dowel pin bore; and
   c) mounting a transducer on an axially extending surface of said upper cylindrical portion of said lower base member in said axial region thereof 2. The method of claim 1 wherein the steps of enlarging said dowel pin bore and machiningly reducing said upper cylindrical portion diameter comprises reducing the cross sectional area of said upper cylindrical portion in a selected axial region thereof to less than half of its original cross sectional area.

3. The method of claim 2 wherein said reduced cross sectional area is approximately 46% of the original cross sectional area.

4. The method of claim 1 comprising the further step of providing a radial bore through said upper cylindrical portion of said base member and extending a lead wire from said transducer assembly therethrough 5. The method of claim 1 comprising the further steps of:
   a) substituting a modified dowel pin for said original dowel pin; said modified dowel pin having a lower portion identical in diameter to the original dowel pin, a midportion having a diameter slightly less than the diameter of said expanded dowel pin bore in the base member, and an upper portion having a diameter less than said midportion diameter; and
   b) mounting said modified dowel pin in non-loadbearing relationship in said dowel pin bores in said base member and said lower die shoe.

6. The method of claim 1, said transducer mounting step comprising mounting a transducer assembly on an outer reduced diameter surface of said upper cylindrical portion 7. The method of claim 6 comprising the step of covering the reduced diameter region of the upper cylindrical portion and the transducer assembly mounted thereon with epoxy.

8. The method of claim 1:
   a) wherein the steps of enlarging said dowel pin bore and machiningly reducing said upper cylindrical portion diameter comprises reducing the cross sectional area of said upper cylindrical portion in a selected axial region thereof by at least 50%;

b) wherein said transducer mounting step comprising mounting a transducer assembly on an outer reduced diameter surface of said upper cylindrical portion;

c) and comprising the further steps of:
  i) substituting a modified dowel pin for said original dowel pin; said modified dowel pin having a lower portion identical in diameter to the original dowel pin, a midportion having a diameter slightly less than the diameter of said expanded dowel pin bore in the base member and an upper portion having a diameter less than said midportion diameter;
  ii) mounting said modified dowel pin in non-load-bearing relationship in said dowel pin bores in said base member and said lower die shoe; and
  iii) covering the reduced diameter region of the upper cylindrical portion and the transducer assembly mounted thereon with epoxy.

9. A method for mounting a transducer assembly on a cylindrical portion of a base member of a progressive can end press comprising the steps of:

a) providing a circumferential recess in a selected axial region of the cylindrical portion;

b) mounting a transducer assembly on the base member in the circumferential recess; and c) filling the circumferential recess with a sealing matrix material.

10. The invention of claim 9 comprising the steps of:

a) providing at least one radially extending bore in the base member; and b) extending a lead from the transducer assembly through the radially extending bore.

* * * * *